2,950,292

3 - ALKOXY - 16 - ALKYL - 16 - HYDROXY-1,3,5(10) - ESTRATRIEN - 17 - ONES, THEIR ETHERS AND ESTERS

David A. Tyner, Skokie, Ill., assignor to G. D. Searle & Co., Chicago, Ill., a corporation of Delaware No Drawing. Filed June 29, 1959, Ser. No. 823,299

6 Claims. (Cl. 260—397.4)

The present invention relates to 3-alkoxy-16-alkyl-16-hydroxy-1,3,5(10)-estratrien-17-ones, their ethers and esters of the structural formula

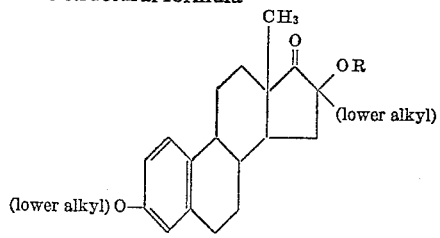

wherein R is a member of the class consisting of hydrogen, lower alkyl and —CO—(lower alkyl) radicals. The lower alkyl groups referred to are preferably methyl and ethyl, but can also be straight-chain and branched propyl, butyl, amyl and hexyl radicals.

The foregoing compounds have valuable pharmacological properties. Particularly they are useful because they produce shifts in blood lipids similar to those obtained by potent estrogens, while the feminizing effects of these drugs are very small. This lipid-shifting (lipodiatic) effect is manifested by a reduction of the plasma cholesterol-phospholipid ratio, particularly in cholesterol fed animals. The utility of natural estrogens in inhibiting arterial deposition of cholesterol is greatly limited because of their general hormonal effects. It is of particular advantage that the lipodiatic agents of this invention are highly selective and that the compounds produce a minimum of hormonal side-effects.

The compounds of this invention are conveniently prepared using as a starting material a 3-alkoxy-16α,17α-epoxy-17β-acetoxy-1,3,5(10)-estratriene. This epoxide can be converted to the 3-alkoxy-16α-hydroxy-1,3,5(10)-estratrien-17-one by treatment with alkali or with acid. The resulting ketol is next treated with dihydropyran and a catalyst such as p-toluenesulfonic acid to yield the tetrahydropyranyl ether. The latter is alkylated with an alkyl iodide, preferably in the presence of an alkali metal tertiary alcoholate, to yield a mixture of the 16α-alkyl and 16β-alkyl derivatives. Hydrolysis with acid yields the 3-alkoxy-16-alkyl-16-hydroxy-1,3,5(10)-estratrien-17-one in which the 16α-epimer predominates. The ethers and esters of this alcohol can be prepared by conventional etherification and esterification procedures.

An alternative preparation for the esters also uses as starting material a 3-alkoxy-16α,17α-epoxy-17β-acetoxy-1,2,5(10)-estratriene which is treated with perchloric acid in acetic acid to yield the 3-alkoxy-16-acetoxy-1,3,5(10)-estratrien-17-one. This compound is alkylated with an alkyl halide, preferably in the presence of an alkali metal tertiary alcoholate, to yield the 3-alkoxy-16-alkyl-16β-acetoxy-1,3,5(10)-estratrien-17-one. Hydrolysis of the ester group yields the 3-alkoxy-16α-alkyl-16β-hydroxy-1,3,5(10)-estratrien-17-one.

An alternate procedure for the preparation of these compounds which is particularly useful for the preparation of the 16β-alkyl isomers uses as a starting material the 3 - alkoxy - 16 - alkyl - 1,3,5(10) - estratriene - 16β, 17-diols which are subjected to oxidation with chromic anhydride whereby the 17-hydroxy group is converted to a 17-oxo group. This oxidation produces as a byproduct 3 - methoxy - 16 - methyl - 16 - oxo - 16,17 - seco - 1,3, 5(10)-estratrien-17-al and 3-methoxy-16-methyl-16-oxo-16,17-seco-1,3,5(10)-estratrien-17-oic acid both of which have a topical local anesthetic activity. Heating of the aldehyde in acetic acid and sodium acetate causes formation of the corresponding 3-alkoxy-D-homo-1,3,5(10)-17-estratetraen-16-one, a compound with estrogenic activity.

Still other starting materials for the compounds of this invention are furnished by the 3-alkoxy-17β-hydroxy-1,3,5(10)-estratrien-16-ones which are alkylated with alkyl halides, preferably in the presence of a sodium or potassium tertiary alcoholate, to yield the 3-alkoxy-16α-alkyl-16β-hydroxy-1,3,5(10)-estratrien-17-ones and then the 16-ethers thereof.

The invention will appear in further detail from a consideration of the following examples which are given for the purpose of illustration only and are not to be construed as limiting the invention in spirit or in scope. Quantities are indicated as parts by weight.

Example 1

From a solution of 28.4 parts of estrone 3-methyl ether and 2.5 parts of p-toluenesulfonic acid in 175 parts of isopropenyl acetate 40 parts are removed in a slow distillation procedure by heating for 10 hours. The residual mixture is cooled in an ice bath, diluted with 220 parts of cold ethyl ether and washed successively with cold saturated sodium bicarbonate solution, water and brine. After drying over sodium sulfate the solvent is evaporated under vacuum. A solution of the residue in 4500 parts of pentane is passed through a column charged with 50 parts of a mixture of 85% silica and 15% magnesia and then concentrated to about 400 parts. On standing there crystallizes 3-methoxy-17-acetoxy-1,3,5(10),16-estratetraene which, recrystallized from cyclohexanol, melts at about 114–115° C.

A solution of 13 parts of this product and 7.21 parts of perbenzoic acid in 200 parts of cold benzene is maintained at 5° C. for 15 hours and then washed successively with sodium hydroxide solution and brine. After drying over sodium sulfate the solvent is removed under vacuum and the residue crystallized from dichloromethane and ethanol to yield 3-methoxy-16α,17α-epoxy-17β-acetoxy-1,3,5(10)-estratriene melting at about 155–160° C.

Example 2

Under a nitrogen atmosphere a solution of 2.76 parts of potassium carbonate and 50 parts of water is added to a stirred suspension of 6.85 parts of 3-methoxy-16α,17α-epoxy-17β-acetoxy-1,3,5(10)-estratriene in 400 parts of ethanol. After 5 minutes the ice bath is removed and the reaction mixture is vigorously stirred at room temperature for 6 hours. The resulting mixture is acidified with 3 parts of acetic acid, diluted with 1,000 parts of water and cooled on an ice bath. The resulting precipitate is recrystallized from a 1:1 mixture of benzene and cyclohexane to yield 3-methoxy-16α-hydroxy-1,3, 5(10)-estratrien-17-one which melts at about 155–156° C. with prior softening at 153° C.

Example 3

A stirred suspension of 3.42 parts of 3-methoxy-16α, 17α-epoxy-17β-acetoxy-1,3,5(10)-estriene in 40 parts of methanol is treated with 4 parts of 18% hydrochloric acid to yield a pink solution which, after 10 minutes, is diluted with 100 parts of water and extracted with dichloromethane. The combined organic phases are washed, dried and evaporated to a partly crystalline residue which is recrystallized from a 1:1 benzene-cyclohexane mixture. The resulting needles of 3-methoxy-16α-hydroxy-1,3,5(10)-estratrien-17-one melt at about 150–153° C.

*Example 4*

To a stirred suspension of 8.3 parts of 3-methoxy-16α-hydroxy-1,3,5(10)-estratrien-17-one and 3 parts of dihydropyran in 135 parts of anhydrous benzene cooled to 5° C. is added a solution of 0.2 part of p-toluenesulfonic acid in 20 parts of anhydrous benzene. After 5 minutes of standing the resulting solution is extracted successively with cold saturated sodium bicarbonate solution and brine, dried over sodium sulfate and concentrated to about 50 parts. The resulting solution of the tetrahydropyranyl ether of 3-methoxy-16α-hydroxy-1,3,5(10)-estratrien-17-one is stirred under a nitrogen atmosphere with 75 parts of a 1.5 molar potassium tertiary amylate solution in tertiary pentanol at 5° C. Then 23 parts of methyl iodide are added and stirring at 5° C. is continued for an hour. An additional 23 part portion of methyl iodide is added and, after stirring at room temperature for an hour, the mixture is heated at gentle reflux for an additional hour. The resulting neutral mixture containing the 3-methoxy-16-methyl-16-hydroxy-1,3,5(10)-estratrien-17-one tetrahydropyranyl ether is treated with 50 parts of water containing 0.5 part of 36% hydrochloric acid. After evaporation of the solvent the crude product is collected on a filter, washed with water and recrystallized from ethanol to yield 3 - methoxy - 16α - methyl - 16β - hydroxy - 1,3,5(10)-estratrien-17-one which melts at about 161–162° C. The compound has the structural formula

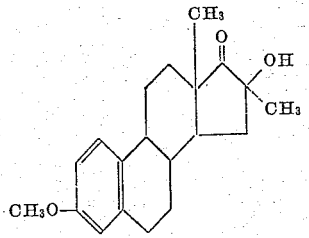

Substitution of equivalent amounts of ethyl iodide for the methyl iodide used in the preceding proceduce yields 3 - methoxy - 16α - ethyl - 16β - hydroxy - 1,3,5(10)-estratrien-17-one in colorless prisms. The infrared absorption spectrum shows maxima at 2.79, 5.72, 7.95, 9.60, and 9.93 microns.

*Example 5*

Under a nitrogen atmosphere 45 parts of a 0.5 molar potassium tertiary amylate solution are added to 2.6 parts of 3-methoxy-16α-methyl-16β-hydroxy-1,3,5(10)-estratrien-17-one in 30 parts of anhydrous benzene. The mixture is stirred for 15 minutes at room temperature, cooled to 5° C. and treated with 23 parts of methyl iodide. After 90 minutes at 5–10° C. the reaction mixture is stirred at room temptrature for an additional 150 minutes and diluted with 150 parts of water. The organic layer is separated, washed with water to neutrality, dried over sodium sulfate and evaporated. The resulting oil is triturated with ethanol whereupon a crude solid is formed which is recrystallized from a 30% aqueous ethanol solution to yield 3,16β-dimethoxy-16α-methyl-1,3,5(10)-estratrien-17-one melting at about 93–94° C. The compound has the structural formula

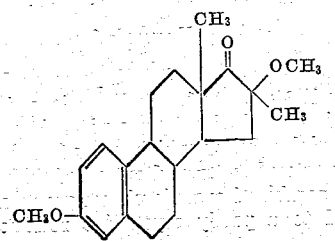

*Example 6*

Under a nitrogen atmosphere 56 parts of a 1-molar solution of potassium tertiary amylate in tertiary pentanol are added at 5° C. to a solution of 20 parts of 3-methoxy-17β-hydroxy-1,3,5(10)-estratrien-16-one in 210 parts of dioxane. After 30 minutes the resulting suspension is treated with 46 parts of methyl iodide and the cooling bath is removed. When the mixture reaches room temperature it is subjected to heating at reflux for 150 minutes, diluted with 500 parts of water and allowed to cool. The resulting oil is separated, washed with water and dried. The solid obtained is recrystallized from dioxane to yield 3,17β-dimethoxy-1,3,5(10)-estratrien-16-one melting at about 203–210° C. The rotation of the 1% chloroform solution α_D is −83°. The mother liquors are evaporated and the residue is chromatographed on a silica gel column. The column is developed with benzene solutions containing increasing concentrations of ethyl acetate. Elution with a 2% solution of ethyl acetate in benzene, concentration of the eluate and recrystallization of the residue from ethanol yields 3,16β - dimethoxy - 16α - methyl - 1,3,5(10)-estratrien-17-one melting at about 93–94° C. The rotation of the 1% chloroform solution is +139°. Elution with a 5% solution of ethyl acetate in benzene yields 3 - methoxy - 16α - methyl - 16β - hydroxy - 1,3,5(10)-estratrien-17-one melting at about 161–162° C.

*Example 7*

A solution of 0.2 part of 3-methoxy-16α-methyl-1,3,5(10)-estratrien-17-one in 5.5 parts of acetyl chloride is heated at reflux for 90 minutes after which the solvent is blown off with a stream of nitrogen. The residue is crystallized twice from aqueous ethanol to yield 3-methoxy - 16α - methyl-16β-acetoxy-1,3,5(10)-estratrien-17-one melting at about 113–114° C.

Substitution of 6.5 parts of butyryl chloride for the acetyl chloride used in the preceding process and refluxing for 2 hours yields 3-methoxy-16α-methyl-16β-butyroxy-1,3,5(10)-estratrien-17-one of the structural formula

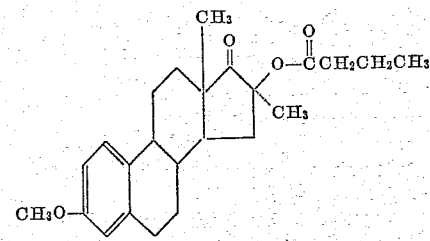

*Example 8*

To a solution of 5 parts of 3-methoxy-16α,17α-epoxy-17β-acetoxy-1,3,5(10)-estratriene in 45 parts of acetic acid cooled to 5° C. is added a solution of 1.5 parts of 70% perchloric acid in 5 parts of acetic acid also cooled to 5° C. After 30 minutes the reaction mixture is treated with 25 parts of saturated sodium bicarbonate solution and then with 175 parts of water and cooled on an ice bath. The crystalline product is collected on a filter, washed and dried. On recrystallization from ethanol there is obtained 3-methoxy-16α-acetoxy-1,3,5(10)-estratrien-17-one melting at about 159–161° C.

To an ice-cooled, stirred solution of 0.35 part of 3-methoxy-16α-acetoxy-1,3,5(10)-estratriene-17-one in 11.5 parts of methyl iodide are added portionwise 22 parts of toluene 0.5 molar with respect to potassium tertiary amylate. After 45 minutes the cooling bath is removed and the mixture is permitted to stand for an hour. Then water is added and the organic layer is separated, dried and concentrated by evaporation of the organic solvent. The resulting residue of 3-methoxy-16α-methyl-16β-acetoxy-1,3,5(10)-estratrien-17-one is dissolved in 4 parts of ethanol under nitrogen atmosphere and treated with 1 part of a 45% potassium hydroxide solution. After heating at reflux for 16 hours the mixture is diluted with water and the resulting product is extracted with benzene. The benzene solution is washed, dried and applied to a silica column which is developed with benzene solutions containing increasing concentrations of ethyl acetate. Elution with a 5% solution of ethyl acetate in benzene, concentration of the eluate, and recrystallization from ethanol yields 3-methoxy-16α-methyl-16β-hydroxy-1,3,5 (10)-estratrien-17-one melting at about 160–161° C.

*Example 9*

To a solution of 1 part of 3-methoxy-16α-methyl-16β-hydroxy-1,3,5(10)-estratrien-17-one in 10 parts of 2-propanol is added a solution of 0.3 part of sodium borohydride in 5 parts of water and maintained at 50–60° C. for an hour. After adding of 5 parts of acetic acid, the mixture is heated at reflux temperature for 5 minutes and diluted with water until turbid. Upon cooling an oily product is obtained which is crystallized from aqueous ethanol to yield 3-methoxy-16α-methyl-1,3,5(10) estratriene-16β,17β-diol melting at about 177–178° C.

*Example 10*

At 18° C. a stirred solution of 3.16 parts of 3-methoxy-16α-methyl-1,3,5(10)-estratriene-16β,17β-diol in 80 parts of acetone is treated with 2.5 parts of chromic anhydride solution which is 8 Normal with respect to both chromium and sulfuric acid and immediately diluted with 8 parts of methanol and then with 100 parts of dilute hydrochloric acid. This aqueous mixture is extracted with dichloromethane. The extract is washed successively with hydrochloric acid, water, 5% sodium hydroxide, water, and dried. The organic solution is dried over sodium sulfate and evaporated to yield a neutral oil. On crystallization from a mixture of benzene and cyclohexane there is obtained 3-methoxy-16α-methyl-16β-hydroxy-1,3,5(10)estratrien-17-one melting at about 160–162° C. The mother liquor is subjected to chromatography on a silica column. The column is developed with benzene solutions containing increasing concentrations of ethyl acetate. Additional yield of 3-methoxy-16α-methyl-16β-hydroxy-1,3,5(10)-estratrien-17-one is obtained from the eluates containing 10% ethyl acetate and benzene.

The 5% ethyl acetate eluate yields an oily product with a specific rotation in chloroform of +65°. This product has been identified as 3-methoxy-16-methyl-16-oxo-16,17-seco-1,3,5(10)-estratrien-17-al of the structural formula

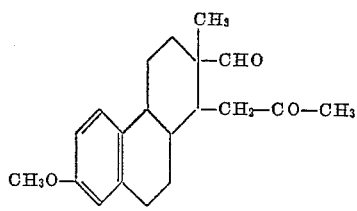

The same product can be obtained in high yield by lead tetraacetate cleavage of 3-methoxy-16α-methyl-1,3,5(10) estratriene-16β,17β-diol.

Heating of a solution of 2 parts of this aldehyde and 4 parts of sodium acetate in 15 parts of acetic acid on the steam bath for 5 hours under a nitrogen atmosphere, dilution with water and cooling yields 3-methoxy-D-homo-1,3,5(10),7-estratetraen-16-one melting at about 147–148° C. It has the structural formula

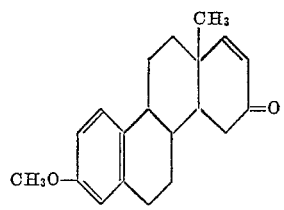

Still an additional product can be obtained from the alkaline washes of the chromic anhydride oxidation mixture described above. Upon acidification of these washes a solid is obtained which, recrystallized from aqueous ethanol, melts at about 191–193° C. and which has been identified as 3-methoxy-16-methyl-16-oxo-16,17-seco-1,3,5(10)-estratrien-17-oic acid of the structural formula

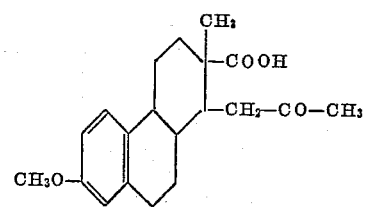

*Example 11*

A reaction mixture consisting of 175 parts of 16-ketoestradiol, 300 parts of potassium carbonate, 4000 parts of ethanol and 2000 parts of ethyl iodide is heated under reflux in a nitrogen atmosphere for 6 hours. It is then concentrated to about one-half of its original volume and diluted with a total of about 10,000 parts of hot water added in small portions. A solid product precipitates during this operation. The mixture is refrigerated, and the solid product is collected on a filter and washed with water. By recrystallization from mixtures of benzene and ethanol there is obtained 16-ketoestradiol 3-monoethyl ether melting at about 180–184° C.

An anhydrous solution of 46 parts of 16-ketoestradiol 3-monoethyl ether in 1800 parts of benzene is treated by the gradual addition of a 3 molar solution of methylmagnesium bromide in butyl ether containing a total of 40 parts of methylmagnesium bromide. The reaction mixture is maintained under reflux in a nitrogen atmosphere for 2 hours, after which acetone is added to react with the excess methylmagnesium bromide. The cooled mixture is then stirred with an excess of saturated ammonium chloride solution and with dilute sulfuric acid, after which the organic phase is separated and washed with additional dilute sulfuric acid, with several portions of water, and with sodium chloride solution. It is then dried and concentrated by vaporization of the solvent to afford an oily or semi-crystalline residue. This residue is washed with petroleum ether and then recrystallized from benzene to afford 3-ethoxy-16-methyl-1,3,5(10)-estratriene-16,17-diol melting at about 175–177° C. after prior softening.

This product is subjected to the chromic anhydride oxidation of the preceding example to yield 3-ethoxy-16α-methyl-16β-hydroxy-1,3,5(10)-estratrien-17-one. The infrared absorption spectrum shows maxima at 2.79, 5.72, 6.21, 6.35, and 9.94 microns.

*Example 12*

A mixture of 14.22 parts of estrone methyl ether, 7.5 parts of paraformaldehyde, 25 parts of dimethylamine hydrochloride and 80 parts of isoamyl alcohol is distilled until a distillate amounting to about 8 parts is removed, following which it is heated under reflux for one hour. Another portion of distillate, amounting to about 20 parts, is collected and discarded. Additional isoamyl alcohol (50 parts) is added, and another distillate, amounting to about 50 parts, is removed. The cooled reaction mixture is then acidified with dilute hydrochloric acid and extracted with several portions of ether. The combined ethereal solution is washed with water until neutral, dried over sodium sulfate, and evaporated to an oily residue. Upon crystallizations of the residue from benzene and drying of the product in a vacuum at 70° C., there is obtained purified 3-methoxy-16-methylene- 1,3,5(10)-estratrien-17-one which melts at about 132–133.5° C. and has a specific rotation of about +113° in chloroform solution.

To a stirred solution of 1.6 parts of 3-methoxy-16-methylene-1,3,5(10)-estratrien-17-one in 25 parts of dioxane, maintained at about 18–25° C., is added 6 parts of cold, 30% hydrogen peroxide followed by a 4 molar solution of sodium hydroxide containing a total of 0.16 part of sodium hydroxide, added in portions over a period of about 30 minutes. An additional quantity of 5 parts of 30% hydrogen peroxide is added in several portions during the next 5 hours. After 15 hours of reaction time the mixture is chilled and diluted with 120 parts of cold water. When separation of the reaction product is complete, the precipitated solid is collected on a filter and thoroughly washed with water. By crystallizations from mixtures of methylene chloride and ethanol there is obtained the purified epoxide which melts at about 169–173° C. and has a specific rotation of about +161° in chloroform solution. This compound is 3-methoxy-16-methyl-16,1'-epoxy-1,3,5(10)-estratrien-17-one, in which the epoxide oxygen is attached in the alpha configuration at position 16.

A solution of 3.12 parts of 3-methoxy-16-methyl-16,1'-epoxy-1,3,5(10)-estratrien-17-one in 700 parts of anhydrous ether is added gradually to a refluxing solution of 3.8 parts of lithium aluminum hydride in 210 parts of anhydrous ether. When the addition is completed, the reaction mixture is heated under reflux for an additional 1½ hours and the excess lithium aluminum hydride is decomposed by adding an ethereal solution of ethyl acetate. A 4 molar solution of sodium hydroxide containing a total of 1.6 parts of sodium hydroxide is added, and the precipitated materials are removed by filtration through diatomaceous earth. The filtrate is distilled to dryness, and the residual glassy product is crystallized from aqueous ethanol. The product obtained in this manner is a hydrate which can exhibit melting points or transition points at about 85–90° C. and at about 123–127° C., each followed by resolidification and final fusion at about 151–153° C. Upon recrystallization from benzene and prolonged drying at about 110° C. in a high vacuum, the product obtained melts directly at about 152–153° C. This compound has a specific rotation of about +78° in chloroform solution. It is the 3-methoxy-16-methyl-1,3,5(10)-estratriene-16,17-diol stereoisomeric at position 16 with the isomer previously described.

This product is subjected to the chromic anhydride oxidation of Example 10 to yield 3-methoxy-16β-methyl-16α-hydroxy-1,3,5(10)-estratrien-17-one. The infrared absorption spectrum shows maxima at 2.99, 5.72, 6.21, 6.35, 6.63, 7.95, 8.80, and 9.95 microns.

What is claimed is:

1. A compound of the formula

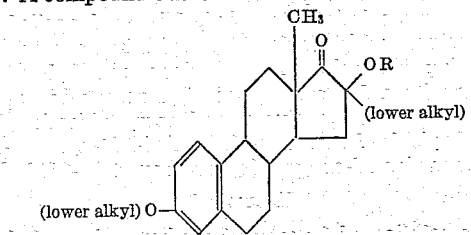

wherein R is a member of the class consisting of hydrogen, lower alkyl and —CO—(lower alkyl) radicals.

2. A compound of the structural formula

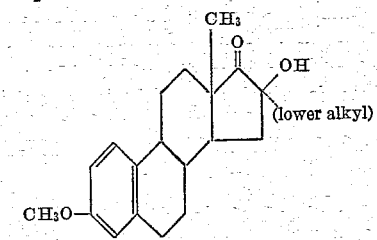

3. 3-methoxy-16α-methyl-16β-hydroxy-1,3,5(10)-estratrien-17-one.

4. 3,16β-dimethoxy-16α-methyl-1,3,5(10)-estratrien-17-one.

5. A compound of the structural formula

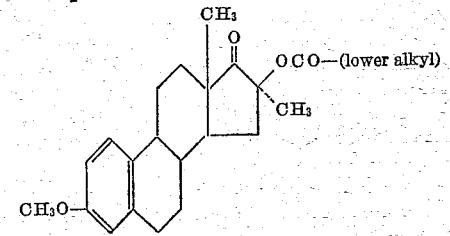

6. 3-methoxy-16α-methyl-16β-acetoxy-1,3,5(10)-estratrien-17-one.

References Cited in the file of this patent

UNITED STATES PATENTS

| | | |
|---|---|---|
| 2,522,177 | Huffman | Sept. 12, 1950 |
| 2,584,271 | Huffman | Feb. 5, 1952 |
| 2,682,548 | Huffman | June 29, 1954 |
| 2,705,239 | Huffman | Mar. 29, 1955 |

OTHER REFERENCES

Mathieu: "Pouvoir Rotatoire Naturels des Steroides," page 476 (1956).

UNITED STATES PATENT OFFICE
CERTIFICATE OF CORRECTION

Patent No. 2,950,292

August 23, 1960

David A. Tyner

It is hereby certified that error appears in the printed specification of the above numbered patent requiring correction and that the said Letters Patent should read as corrected below.

Column 1, line 61, for "1,2,5(10)-" read -- 1,3,5(10)- --; column 3, lines 66 to 75, the formula should appear as shown below instead of as in the patent:

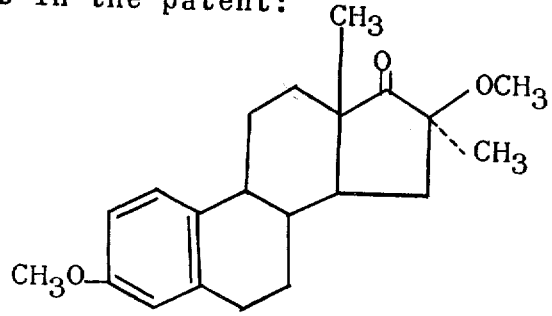

Column 5, line 65, for "-1,3,5(10),7-" read -- -1,3,5(10),17- --.

Signed and sealed this 18th day of April 1961.

(SEAL)
Attest:

ERNEST W. SWIDER
Attesting Officer

DAVID L. LADD
Commissioner of Patents